US009674743B2

(12) United States Patent
Kim et al.

(10) Patent No.: US 9,674,743 B2
(45) Date of Patent: Jun. 6, 2017

(54) METHOD FOR PERFORMING MEASUREMENT OF OBJECTS AND A DEVICE THEREFOR

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 14/768,004

(22) PCT Filed: Mar. 11, 2014

(86) PCT No.: PCT/KR2014/001999
§ 371 (c)(1),
(2) Date: Aug. 14, 2015

(87) PCT Pub. No.: WO2014/142512
PCT Pub. Date: Sep. 18, 2014

(65) Prior Publication Data
US 2015/0373597 A1 Dec. 24, 2015

Related U.S. Application Data

(60) Provisional application No. 61/786,608, filed on Mar. 15, 2013.

(51) Int. Cl.
*H04W 36/00* (2009.01)
*H04W 24/10* (2009.01)
(Continued)

(52) U.S. Cl.
CPC ......... *H04W 36/0088* (2013.01); *H04W 8/08* (2013.01); *H04W 24/10* (2013.01);
(Continued)

(58) Field of Classification Search
CPC ........... H04W 36/0094; H04W 84/045; H04W 36/0061; H04W 36/0016; H04W 24/10
See application file for complete search history.

(56) References Cited

U.S. PATENT DOCUMENTS

2010/0260052 A1   10/2010   Cho et al.
2011/0070881 A1*  3/2011    Hwang ................ H04W 24/10
                                                 455/423

(Continued)

FOREIGN PATENT DOCUMENTS

KR   10-2012-0083192 A   7/2012
WO   2013-009127 A2      1/2013

OTHER PUBLICATIONS

International Search Report from PCT/KR2014/001999, dated Jun. 23, 2014.
(Continued)

*Primary Examiner* — Khalid Shaheed
(74) *Attorney, Agent, or Firm* — Dentons US LLP

(57) ABSTRACT

The present invention relates to a wireless communication system. More specifically, the present invention relates to a method and a device for performing measurement objects in the wireless communication system, the method comprising: receiving measurement configuration indicating an object to be measured; determining activating or deactivating measurement of the object depending on an activation condition; and measuring the object when the measurement of the object is activated.

8 Claims, 9 Drawing Sheets

(51) Int. Cl.
*H04W 8/08* (2009.01)
*H04W 36/30* (2009.01)
*H04W 88/02* (2009.01)

(52) U.S. Cl.
CPC ....... *H04W 36/0016* (2013.01); *H04W 36/30* (2013.01); *H04W 88/02* (2013.01)

(56) References Cited

U.S. PATENT DOCUMENTS

| | | |
|---|---|---|
| 2012/0155312 A1 | 6/2012 | Kim et al. |
| 2012/0238268 A1* | 9/2012 | Radulescu ........ H04W 36/0061 455/435.1 |
| 2012/0327802 A1 | 12/2012 | Jung et al. |
| 2013/0102243 A1* | 4/2013 | Gunnarsson .......... H04W 16/28 455/11.1 |
| 2013/0203419 A1* | 8/2013 | Siomina ................ H04W 36/18 455/437 |
| 2014/0162650 A1* | 6/2014 | Islam ................ H04W 36/0083 455/436 |

OTHER PUBLICATIONS

Written Opinion of the ISA from PCT/KR2014/001999, dated Jun. 23, 2014.

* cited by examiner (a) contol - plane protocol stack (b) user - plane protocol stack

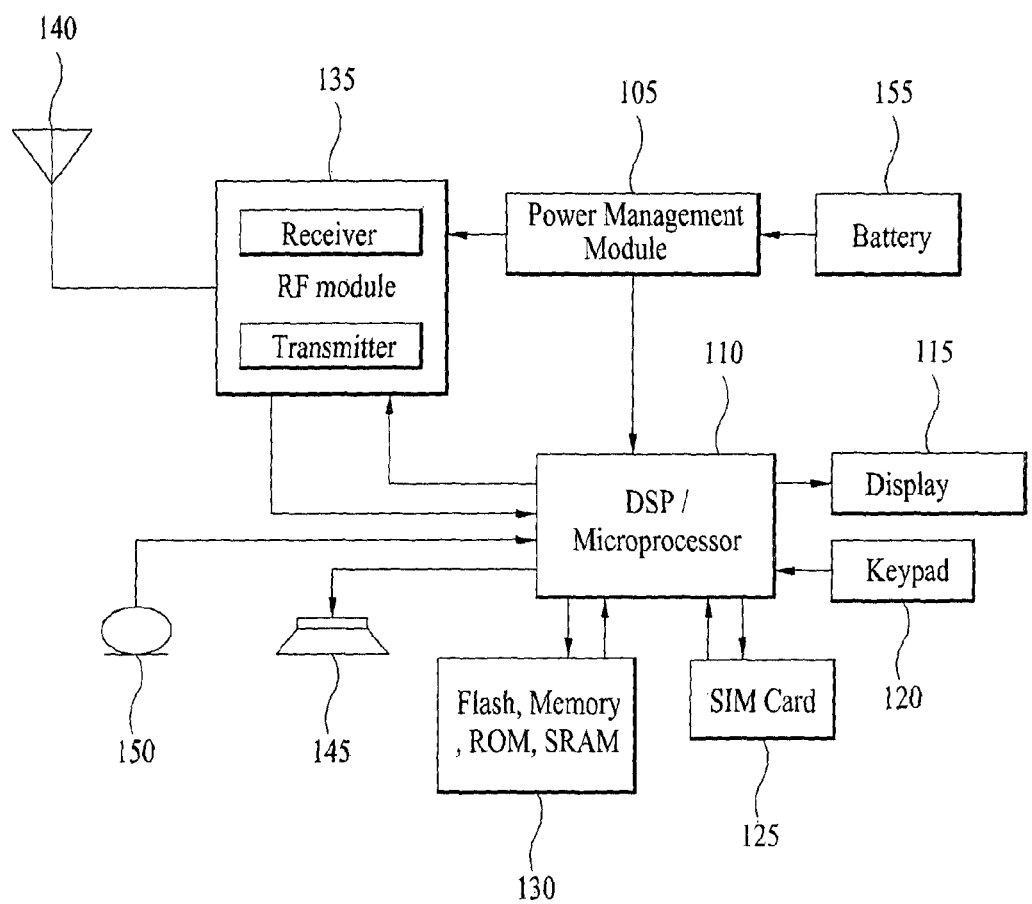

METHOD FOR PERFORMING MEASUREMENT OF OBJECTS AND A DEVICE THEREFOR

This application is a 35 USC §371 National Stage entry of International Application No. PCT/KR2014/001999 filed on Mar. 11, 2014, which claims priority to US Provisional Application No. 61/786,608, filed on Mar. 15, 2013, all of which are incorporated by reference in their entirety herein.

TECHNICAL FIELD

The present invention relates to a wireless communication system and, more particularly, to a method for performing measurement of objects and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd. Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for measuring an object in a wireless communication system. The technical problems solved by the present invention are not limited to the above technical problems and those skilled in the art may understand other technical problems from the following description.

Technical Solution

The object of the present invention can be achieved by providing a method for operating by an user equipment (UE) in wireless communication system, the method comprising; receiving measurement configuration information indicating an object to be measured; determining whether to activate or deactivate measurement of the object depending on an activation condition; and measuring the object when the measurement of the object is activated.

In another aspect of the present invention, provided herein is a UE (User Equipment) in the wireless communication system, the UE comprising: an RF (Radio Frequency) module; and a processor to control the RF module, wherein the processor configured to receive measurement configuration indicating an object to be measured, to determine whether to activate or deactivate measurement of the object depending on an activation condition, and to measure the object when the measurement of the object is activated.

Preferably, the object is at least of a frequency or a cell to be measured.

Preferably, the measurement configuration further indicates whether the object is a first object or a second object and if the object is the first object, the first object is measured without said determining.

Preferably, the activation condition comprises at least proximity of small cell, UE mobility or data load of serving cell.

Preferably, if the activation condition is the proximity of small cell, the object is activated when the UE gets close to a small cell and the object is deactivated when the UE goes away from the small cell, or if the activation condition is the proximity of small cell, the object is deactivated when the UE gets close to a small cell and the object is activated when the UE goes away from the small cell.

Preferably, if the activation condition is the UE mobility, the object is activated when the UE mobility is lower than a threshold value and the object is deactivated when UE mobility is higher than the threshold value, or if the activation condition is the UE mobility, the object is deactivated when the UE mobility is lower than a threshold value and the object is activated when UE mobility is higher than the threshold value.

Preferably, if the activation condition is the data load of serving cell, the object is activated when the data load of serving cell is greater than a threshold value and the object is deactivated when the data load of serving cell is less than the threshold value, or if the activation condition is the data load of serving cell, the object is deactivated when the data load of serving cell is greater than a threshold value and the object is activated when the data load of serving cell is less than the threshold value.

Preferably, the method further comprises to receive initial state information indicating whether the initial state of the object is activated or not.

Advantageous Effects

According to the present invention, measurement of an object (e.g. frequency or cell) can be efficiently performed in a wireless communication system. Specifically, the handover procedure can be efficiently performed in small cell measurement.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 11 is a block diagram of a communication apparatus according to an embodiment of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
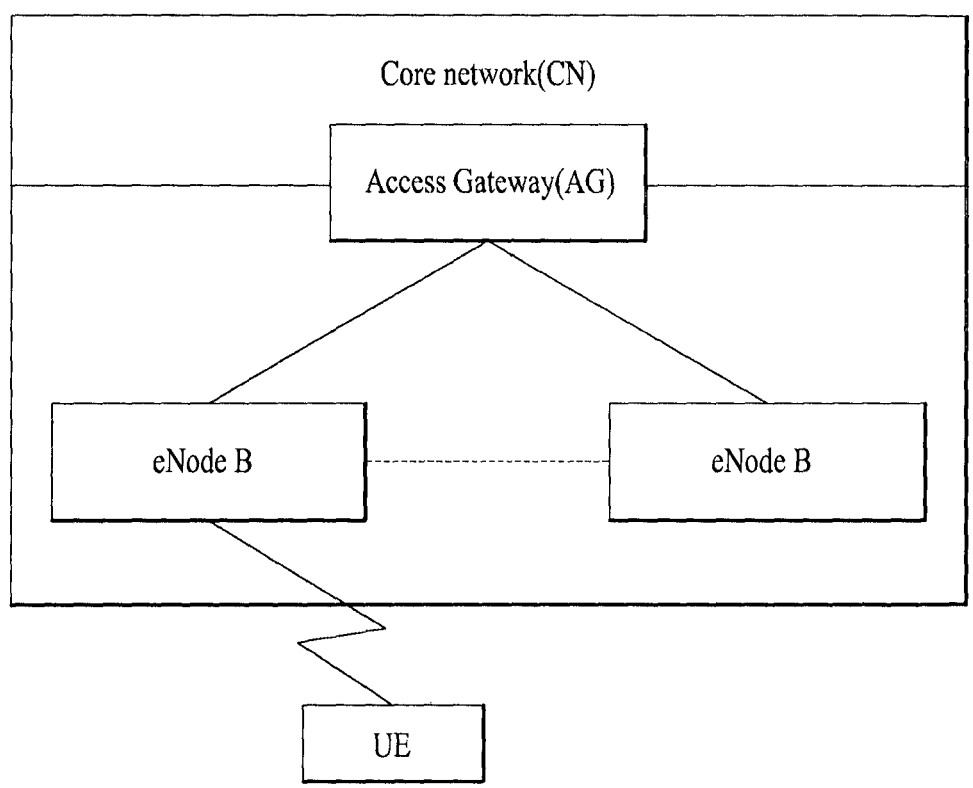
FIG. 1 is a diagram showing a network structure of an Evolved Universal Mobile Telecommunications System (E-UMTS) as an example of a wireless communication system.
Figure 2A:
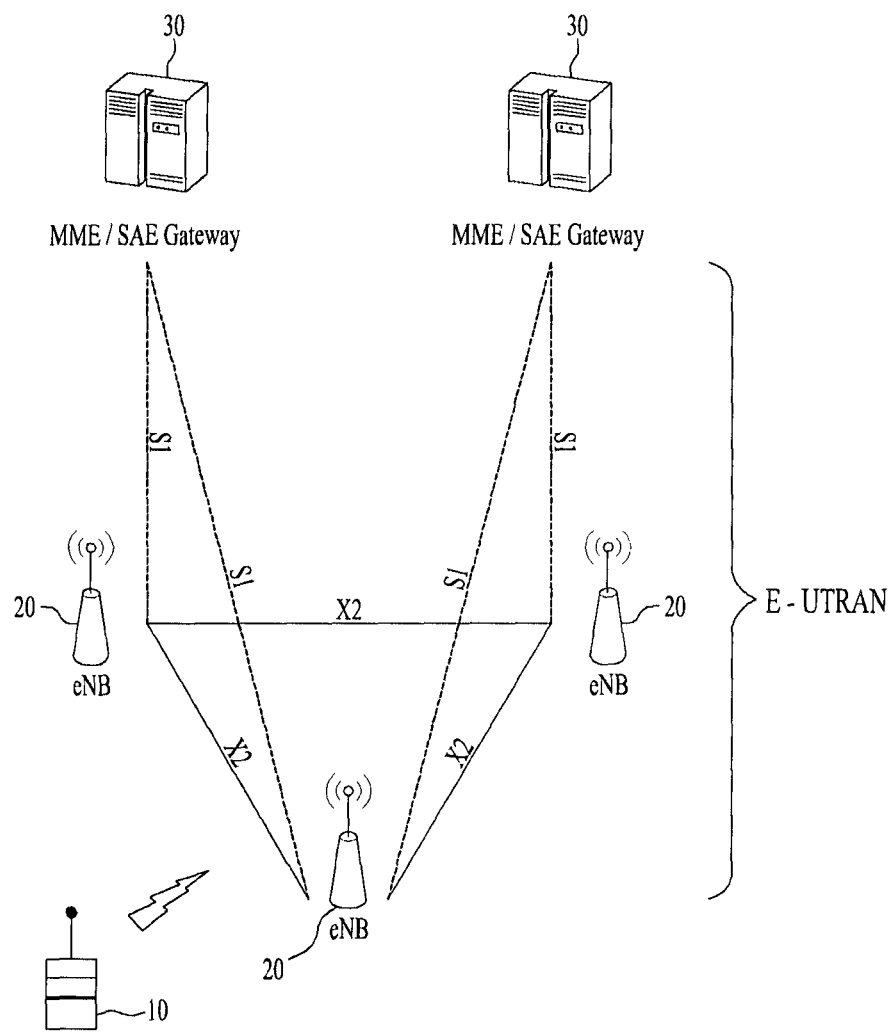
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
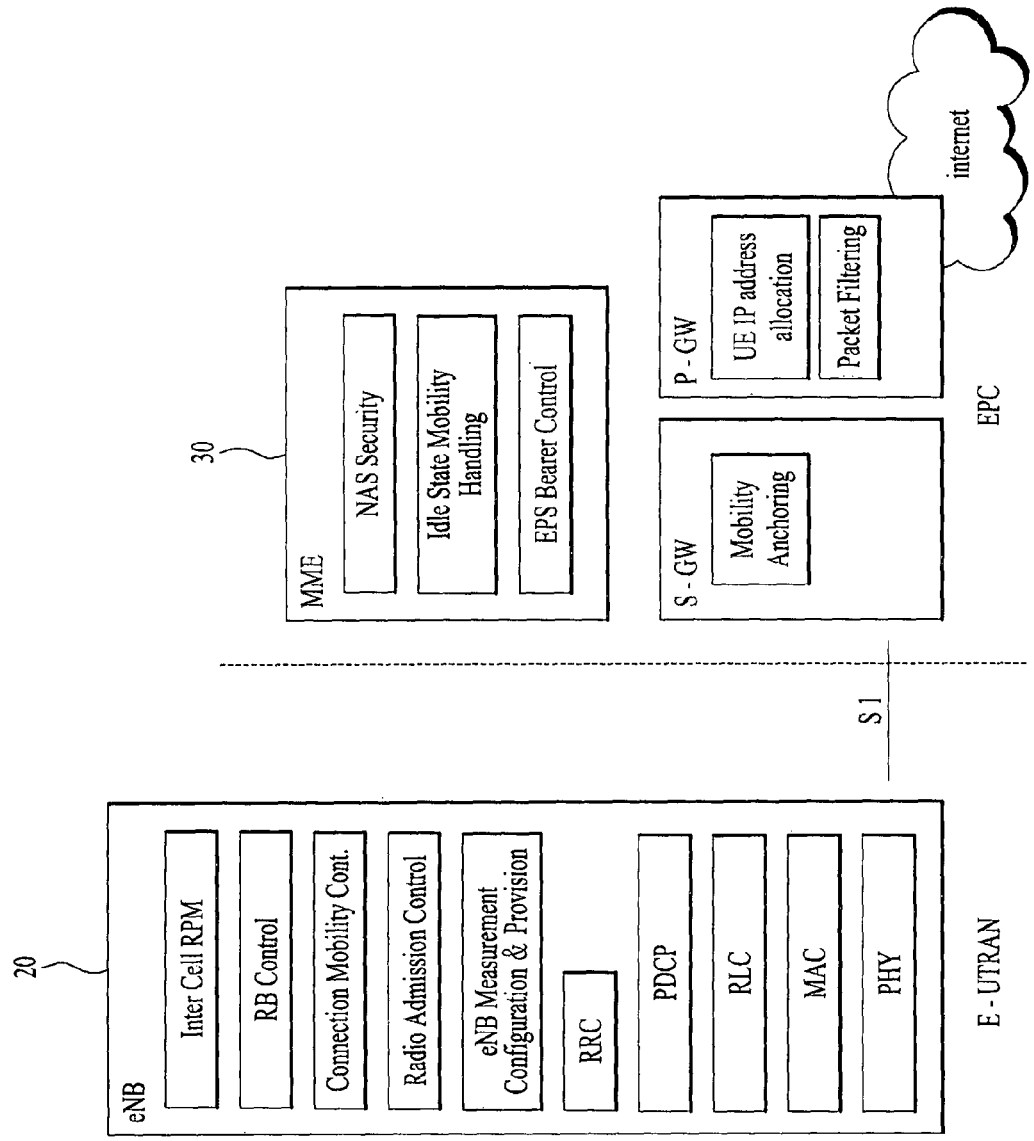
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
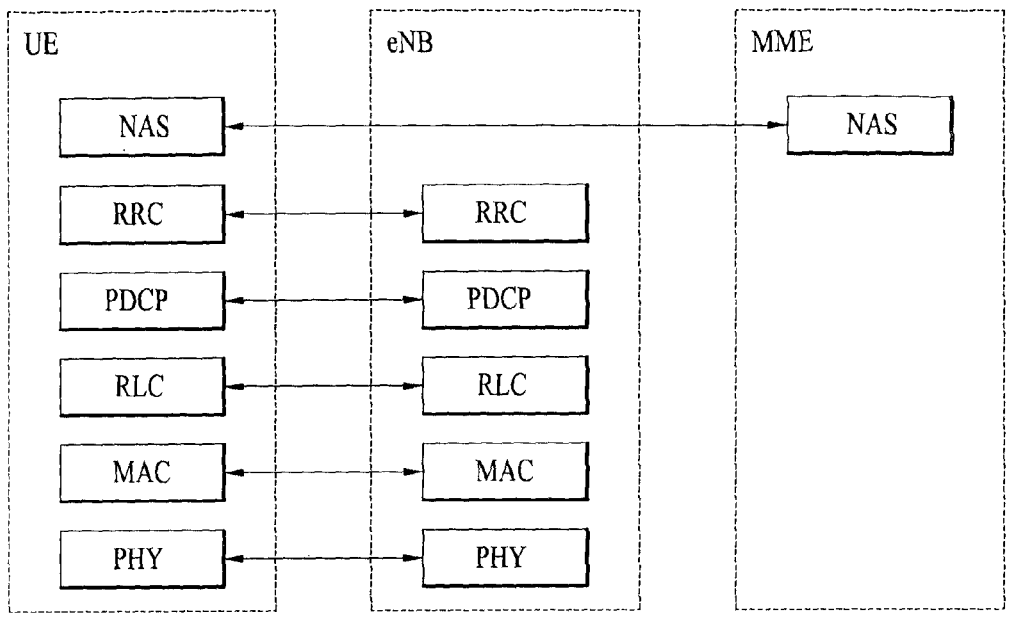
FIG. 3 is a diagram showing a control plane and a user plane of a radio interface protocol between a UE and an E-UTRAN based on a 3rd generation partnership project (3GPP) radio access network standard.
Figure 3:
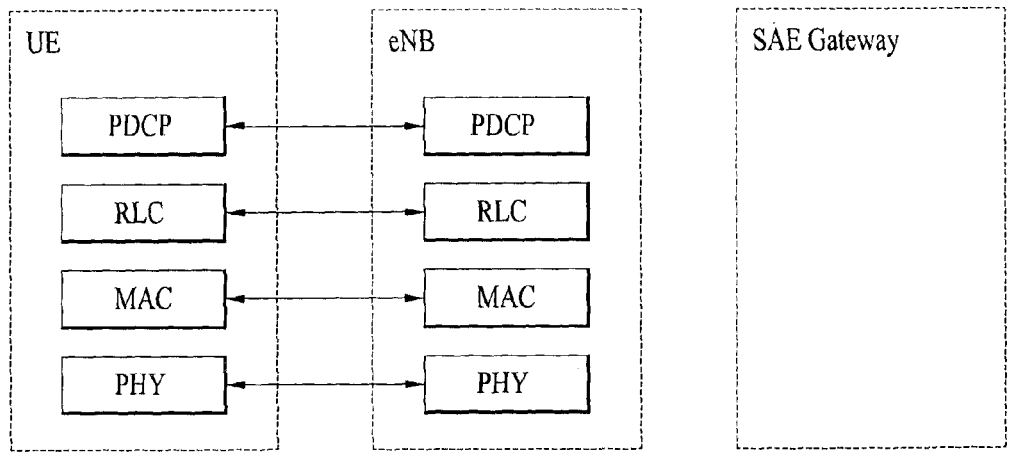

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
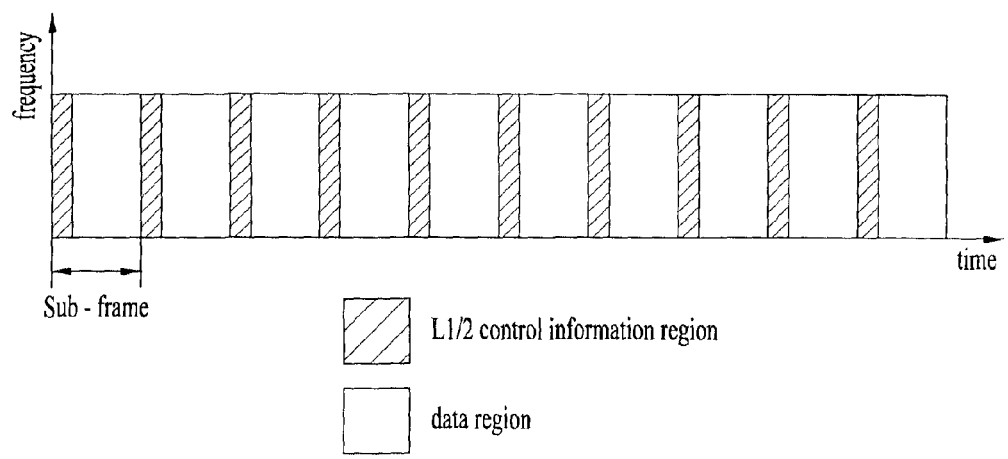
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
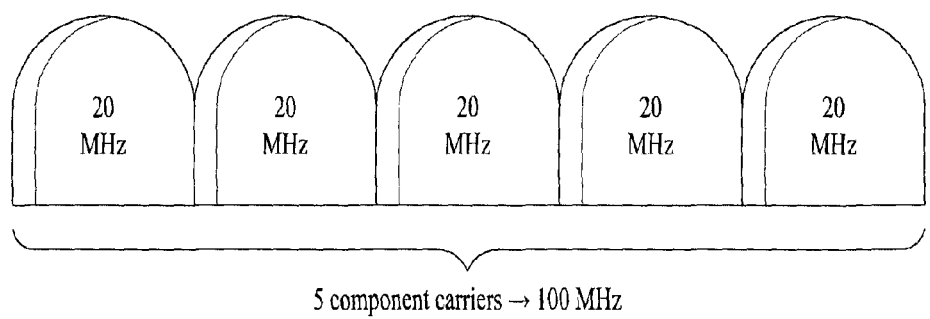
FIG. 5 is a diagram for carrier aggregation.

FIG. 5 is a diagram for carrier aggregation. Carrier aggregation technology for supporting multiple carriers is described with reference to FIG. 5 as follows.

As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
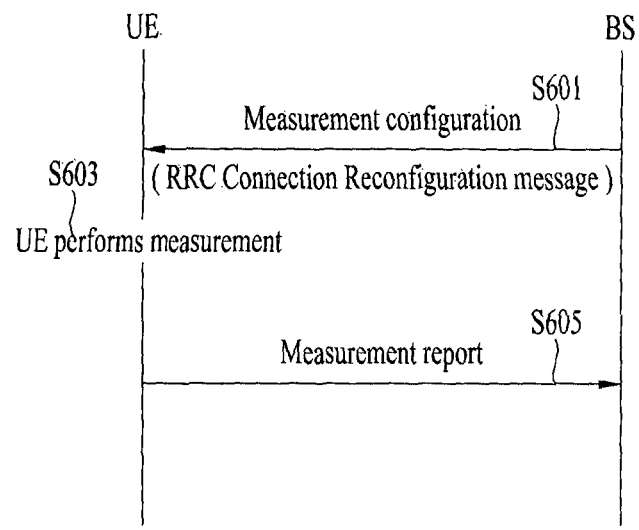
FIG. 6 is a conceptual diagram for performing measurement and reporting the measurement result by a UE.

FIG. 6 is a conceptual diagram for performing measurement and reporting the measurement result by a UE.

E-UTRAN (Evolved-UMTS Terrestrial Radio Access Network) provides the measurement configuration applicable for a UE in RRC_CONNECTED by means of dedicated signaling, i.e. using the RRCConnectionReconfiguration message (S601).

The UE can be requested to perform the following types of measurements (S603): i) measurements at the downlink carrier frequency(ies) of the serving cell(s) (Intra-frequency measurements), ii) measurements at frequencies that differ from any of the downlink carrier frequency(ies) of the serving cell(s) (Inter-frequency measurements), iii) Inter-RAT measurements of UTRA frequencies, iv) Inter-RAT measurements of GERAN frequencies, v) Inter-RAT measurements of CDMA2000 HRPD or CDMA2000 1×RTT frequencies.

The measurement configuration includes the following parameters:

1. Measurement objects: The objects on which the UE shall perform the measurements. i) For intra-frequency and inter-frequency measurements a measurement object is a single E-UTRA carrier frequency. Associated with this carrier frequency, E-UTRAN can configure a list of cell specific offsets and a list of 'blacklisted' cells. Blacklisted cells are not considered in event evaluation or measurement reporting, ii) For inter-RAT UTRA measurements a measurement object is a set of cells on a single UTRA carrier frequency, iii) For inter-RAT GERAN measurements a measurement object is a set of GERAN carrier frequencies, iv) For inter-RAT CDMA2000 measurements a measurement object is a set of cells on a single (HRPD or 1×RTT) carrier frequency.

2. Reporting configurations: A list of reporting configurations where each reporting configuration consists of the following: i) Reporting criterion: The criterion that triggers the UE to send a measurement report. This can either be periodical or a single event description, ii) Reporting format: The quantities that the UE includes in the measurement report and associated information (e.g. number of cells to report).

3. Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

4. Quantity configurations: One quantity configuration is configured per RAT type. The quantity configuration defines the measurement quantities and associated filtering used for all event evaluation and related reporting of that measurement type. One filter can be configured per measurement quantity.

5. Measurement gaps: Periods that the UE may use to perform measurements, i.e. no (UL, DL) transmissions are scheduled.

The UE reports measurement information in accordance with the measurement configuration as provided by E-UTRAN (S605).

E-UTRAN only configures a single measurement object for a given frequency, i.e. it is not possible to configure two or more measurement objects for the same frequency with different associated parameters, e.g. different offsets and/or blacklists. E-UTRAN may configure multiple instances of the same event (e.g. by configuring two reporting configurations with different thresholds).

The UE maintains a single measurement object list, a single reporting configuration list, and a single measurement identities list. The measurement object list includes measurement objects, that are specified per RAT type, possibly including intra-frequency object(s) (i.e. the object(s) corresponding to the serving frequency(ies)), inter-frequency object(s) and inter-RAT objects. Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

A plurality of cells can be distinguished as its roles in the measurement procedures. Serving cells comprise PCell and one or more SCell if configured for a UE supporting CA (Carrier Aggregation). List cells are cells listed within the measurement objects. Detected cells are cells that are not listed within the measurement object(s) but are detected by the UE on the carrier frequency(ies) indicated by the measurement object(s).

For E-UTRA, the UE measures and reports on the serving cell(s), listed cells and detected cells. For inter-RAT UTRA, the UE measures and reports on listed cells and optionally on cells that are within a range for which reporting is allowed by E-UTRAN. For inter-RAT GERAN, the UE measures and reports on detected cells. For inter-RAT CDMA2000, the UE measures and reports on listed cells.

Regarding the step of S601, the E-UTRAN applies to ensure that, whenever the UE has a measurement configuration, it includes a measurement object for each serving frequency. And also the E-UTRAN applies to configure at most one measurement identity using a reporting configuration with the purpose set to reportCGI (Cell Global Identification).

Regarding the step of S603, the UE performs the measurement object according to the measurement configuration. If the UE receives the measurement configuration including a "measObjectToRemoveList", the UE performs the measurement object removal procedure. If the UE received the measurement configuration including a "measObjectToAddModList", the UE performs the measurement object addition or modification procedure. If the UE received the measurement configuration including a "reportConfigToRemoveList", the UE performs the reporting configuration removal procedure. If the UE received the measurement configuration including a "reportConfigToAddModList", the UE performs the reporting configuration addition or modification procedure. If the UE received the measurement configuration including a "quantityConfig", the UE performs the quantity configuration procedure. If the UE received the measurement configuration including a "measIdToRemoveList", the UE performs the measurement identity removal procedure. If the UE received the measurement configuration including a "measIdToAddModList", the UE performs the measurement identity addition/modification procedure. If the UE received the measurement configuration including a "measGapConfig", the UE performs the measurement gap configuration procedure. If the UE received the measurement configuration including a "s-Measure", the UE sets the parameter s-Measure within VarMeasConfig to the lowest value of the RSRP ranges indicated by the received value of s-Measure. If the UE received the measurement configuration including a "preRegistrationInfoHRPD", the UE forwards the preRegistrationInfoHRPD to CDMA2000 upper layers. If the UE received the measurement configuration including a "speedStatePars", the UE sets the parameter speedStatePars within VarMeasConfig to the received value of speedStatePars.

Regarding the step of S605, the UE transfers measurement results to E-UTRAN. For the measurement ID for which the measurement reporting procedure was triggered, the UE shall set the measurement results within the measurement report message.

Figure 7:
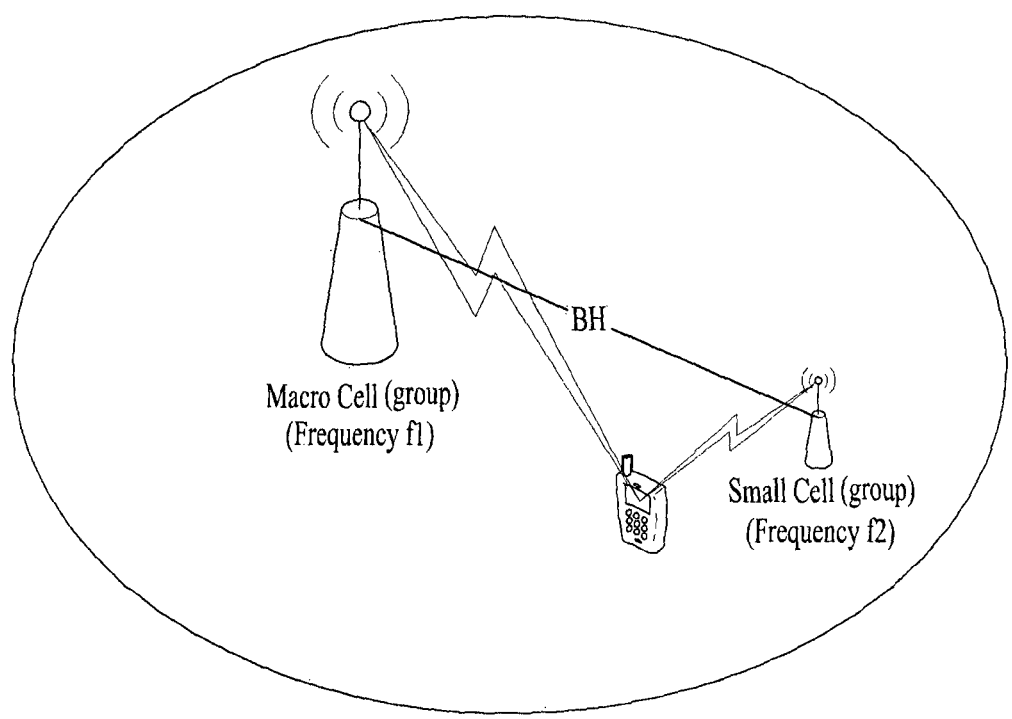
FIG. 7 is a conceptual diagram for dual connectivity between a macro cell and a small cell.

FIG. 7 is a conceptual diagram for dual connectivity between a macro cell and a small cell.

In the next system of LTE-A, a plurality of small cells (e.g, micro cell) may be present in a big cell (e.g. macro cell) having larger coverage than the small cells for optimization of data traffic, etc. For example, a macro cell and a micro cell may be combined for one user equipment (e.g. the dual connectivity). If the macro cell is used for managing mobility of the UE mainly (e.g. PCell) and the micro cell is used for boosting throughput mainly in this situation (e.g. SCell), the plurality of cells combined to the UE have different coverage each other. And each of cells can be managed by each of base stations. The base stations are geographically separated (inter-site CA).

The dual connectivity means that the UE can be connected to both the macro cell and the small cell at the same time. With dual connectivity, some of the data radio bearers (DRBs) can be offloaded to the small cell to provide high throughput while keeping scheduling radio bearers (SRBs) or other DRBs in the macro cell to reduce the handover possibility. The macro cell is operated by MeNB (Macro cell eNB) via the frequency of f1, and the small cell is operated by SeNB (Small cell eNB) via the frequency of f2. The frequency f1 and f2 may be equal. The backhaul interface between MeNB and SeNB is non-ideal, which means that there is considerable delay in the backhaul and therefore the centralized scheduling in one node is not possible.

To benefit from the dual connectivity, the best-effort traffic which is delay tolerant is offloaded to small cell while the other traffic, e.g SRBs or real-time traffic, is still serviced by the macro cell.

Figure 8:
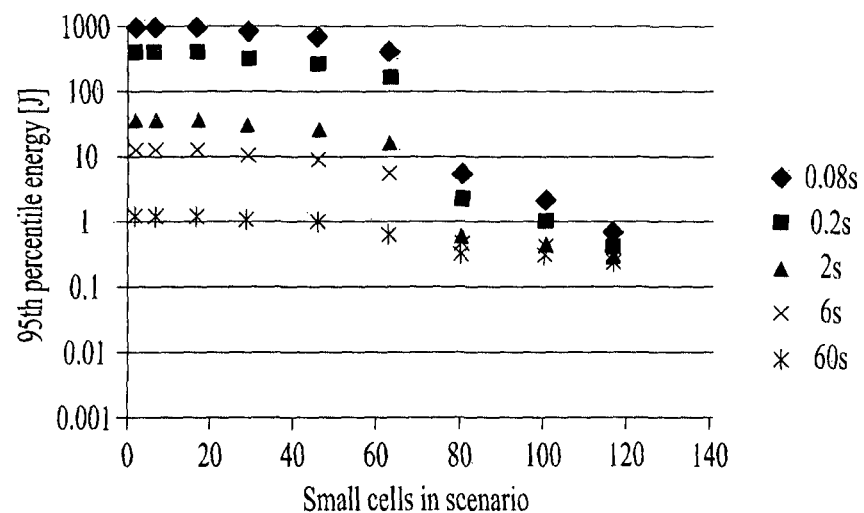
FIG. 8 is a showing for simulation results on 95th percentile energy used for inter-frequency small cell measurements.

FIG. 8 is a showing for simulation results on 95th percentile energy used for inter-frequency small cell measurements.

Small cells can be deployed for various reasons, resulting in a heterogeneous network comprising small cells of different sizes/types (e.g. micro, pico, femto). One expected scenario is the offloading of users from macro layer to small cell layer where the macro layer and small cell layer are on different carrier frequencies. For example, if it is focused on a scenario where one macro frequency provides full coverage and where pico cells are provided on second frequency layer for offloading purposes including means to improve perceived QoS on hot spot locations. For inter-frequency small cell detection, it will focus on the following use case where the UE does inter-frequency small cell measurements for a carrier that is expected to have non-uniform coverage (e.g. hotspot deployment) for offloading/load balancing purposes.

The objective is to optimize the data offloading potential (e.g. maximize the amount of data that is transmitted in pico cells rather than in macro cells; maximize the time a UE stays out of the macro cell) with the following criteria:

Criteria 1) UE power consumption for inter-frequency small cell measurements in HetNet (Hetero Network) deployments should be minimised.

Criteria 2) Any interruptions on the serving cell(s) due to inter-frequency small cell measurements should be minimised.

Criteria 3) Inter-frequency mobility performance should not be degraded by measuring inter-frequency small cells.

Criteria 4) Mobility performance of legacy UEs should not be degraded to improve inter-frequency small cell detection by UEs supporting LTE-A system.

The impact to UE power consumption depends on how often and for how long a UE performs inter-frequency measurements. In particular, UE power consumption relative to how much offloading opportunity and QoS benefit is lost e.g., due to delayed detection of the small cell. As FIG. 8, it also investigates whether the same findings apply also to detection of candidate SCells on the second frequency layer. Enhancements were evaluated against mechanisms that can be realized with available functionality.

In the target use case above described, small cells provide hot spot coverage overlapping with macro cells providing continuous coverage. Since the UE would not know when the small cell coverage is available, the UE may always have to do inter-frequency measurements for identifying small cells. If the UE is always required to perform measurements, significant UE power consumption is expected. As FIG. 8, if the existing gap pattern (e.g., 6 ms measurement gap every 80 ms period) is applied, approximately 1000 J energy consumption is observed when the number of measured cells is less than 20. That is, it was concluded that continuously performing measurements according to existing performance requirements results in very high battery consumption without showing significant impact on offloading potential.

In small cell deployment scenario, intensive inter-frequency small cell measurements for the purpose of offloading are not desirable in terms of UE power consumption and serving cell service interruption time. It is desirable that UE performs inter-frequency small cell measurement only when the data offloading for the serving cell is needed and the UE is near small cell deployed for offloading.

However, to achieve this inter-frequency small cell measurement optimization, measurement reconfiguration will be required very frequently. For example, when the data load of serving cell becomes light and data offloading is no longer needed, the serving cell should re-configure measurement for all connected UE not to measure inter-frequency small cell any more. And then, when the data load becomes heavy again and the serving cell wants to offload data, the serving cell should re-configure measurement for all connected UE to measure inter-frequency small cell again. If the conditions for triggering measurement reconfiguration, e.g. proximity of small cell and the data load of serving cell, change dynamically, signaling overhead caused by measurement reconfiguration will increase considerably.

Furthermore, the measurement re-configuration may cause data offloading delay because UE cannot measure inter-frequency small cell until completion of the measurement reconfiguration though it gets close to the inter-frequency small cell.

Figure 9:
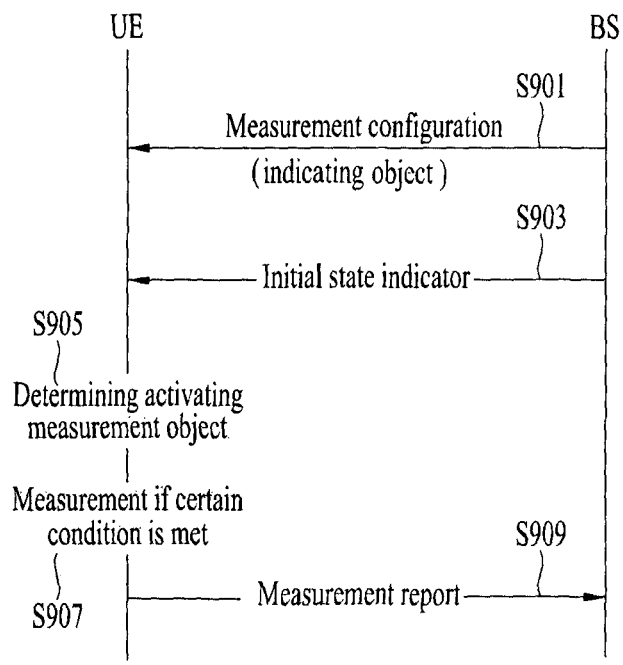
FIG. 9 is a conceptual diagram for measuring an object according to embodiments of the present invention.

FIG. 9 is a conceptual diagram for measuring an object according to embodiments of the present invention.

The UE received measurement configuration indicating an object to be measured from a serving cell (S901). The serving cell may be a macro cell. The object may be at least of a frequency or a cell to be measured. The cell may be one or more small cells located in the serving cell coverage. The small cell can be a cell having a smaller coverage than coverage of the serving cell (e.g., a pico-cell, a femto-cell, etc.) The measurement configuration further includes a type indicator indicating whether the object is a first object or a second object.

The first object is a normal measurement object. That means the first object can be measured without any condition when the serving cell commands a measurement report. On the other hand, the second object is a measurement object that UE can activate or deactivate. Through the measurement configuration, the UE can distinguish the second object from the first object.

Alternatively, the type indicator can be added only to the second object. In this case, UE may consider the object without the type indicator as first object. The type indicator can be defined per the object.

The UE further receives initial state indicator indicating whether the initial state of the object is activated or not from a serving cell (S903).

Desirably, the initial state of second object is deactivated state. Upon receiving measurement configuration from serving cell, UE starts measuring only for the first object until the second object becomes activated state. When the second object becomes activated state, the UE starts measuring for the second object.

Alternatively, the initial state indicator can be used to indicate the initial state of the second object. The initial state indicator can be defined per second object or per UE.

If the initial state indicator indicates that the second object is in deactivate state, the UE starts measuring for the second object when the second object becomes activated state. On the other hand, if the initial state indicator indicates that the second object is in activate state, the UE starts measuring for the second object immediately.

After steps S901 and S903, the UE determines activating or deactivating measurement of the object depending on an activation condition (S905). If the activation condition is met, the UE will activate the object and start measurement for the object (S907).

The activation condition can be transmitted by the serving cell through UE specific signals, broadcasting signals or multicasting signals.

The activation condition includes at least proximity of small cell, UE mobility or data load of serving cell etc.

The activation condition can be proximity of small cell. In this case, the object is activated when the UE gets close to a small cell and the object is deactivated when the UE grows away from the small cell. Or, the object is deactivated when the UE gets close to a small cell and the object is activated when the UE goes away from the small cell.

The activation condition can be UE mobility. In this case, the object is activated when the UE mobility is lower than a threshold and the object is deactivated when UE mobility is higher than the threshold. Or, the object is deactivated when the UE mobility is lower than a threshold value and the object is activated when UE mobility is higher than the threshold value.

The activation condition can be the data load of serving cell. In this case, the object is activated when the data load of serving cell becomes heavy and the object is deactivated when the data load of serving cell becomes light. Or, the object is deactivated when the data load of serving cell is greater than a threshold value and the object is activated when the data load of serving cell is less than the threshold value.

Desirably, one or more activation conditions can be configured to the UE. For example, if the activation conditions are 'proximity of small cell' and 'data load of serving cell', the UE will activate the object when either it gets close to small cell or the data load of serving cell becomes heavy.

Desirably, two or more activation conditions can be configured as one condition. For example, if the activation condition is 'proximity of small cell and data load of serving cell', the UE will activate the object B only when it gets close to small cell and the data load of serving cell is heavy.

Desirably, the UE can activate or deactivate the object autonomously without the activation condition configured by the serving cell.

Desirably, the object to be activated or deactivated can be the second object.

After the step of S907, the UE can transmit measurement report to the serving cell (S909), the UE can perform a handover to the object by commend of the serving cell.

Figure 10:
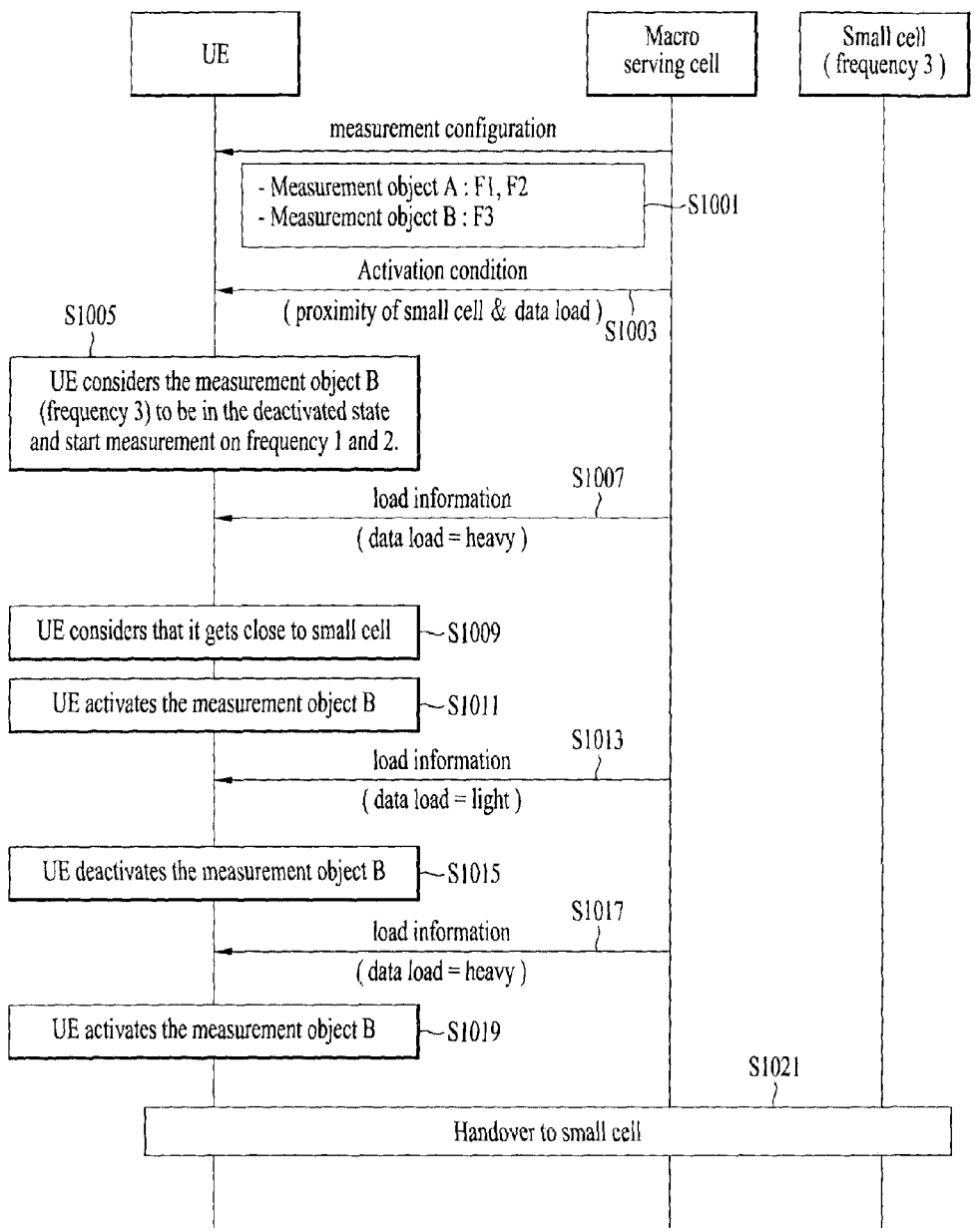
FIG. 10 is a diagram illustrating one of scenarios for measuring an object according to embodiments of the present invention.

FIG. 10 is a diagram illustrating one of scenarios for operating according to embodiments of the present invention.

The UE receives measurement configuration from the serving cell (S1001). The serving cell can configure both measurement object A and measurement object B to UE. The serving cell can be a macro cell and the measurement object A and B can be a frequency of a small cell located in the macro serving cell's coverage. Frequency 3 is used for small cells deployed for data offloading of macro cell, so the frequency 3 is set as the measurement object B.

The UE can receive the activation condition, the activation condition being the 'proximity of small cell and the load of serving cell' (S1003).

If an initial state indication is not used, upon receiving measurement configuration from a serving cell, the UE considers the measurement object B (e.g. frequency 3) to be in the deactivated state and starts measurement for measurement object A (e.g. frequency 1 and 2) (S1005).

The UE receives load information from serving cell. The macro serving cell is overloaded (S1007). But UE doesn't activate the measurement object B because it does not considers it gets close to small cell.

The UE considers that it gets close to small cell (S1009). The activation condition is met, so the UE starts measurement for the measurement object B (S1011).

The UE receives load information from the serving cell. The load of macro serving cell becomes light (S1013). Upon receiving this load information, the UE deactivates the measurement object B and stop measuring on frequency 3 (S1015).

The UE receives load information from the serving cell. The load of macro serving cell becomes heavy (S1017). Upon receiving this load information, the UE activates the measurement object B and start measuring on frequency 3 (S1019). And the UE is handed over to a small cell (S1021).

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 10 may represent a network apparatus comprising a transmitter (135) configured to transmit a request message to a UE and a receiver (135) configured to receive the transmission or reception timing information from the UE. These transmitter and receiver may constitutes the transceiver (135). The network further comprises a processor (110) connected to the transmitter and the receiver. This processor (110) may be configured to calculate a latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   receiving measurement configuration information indicating a measurement object for which a first frequency is to be measured;
   receiving data load information of a macro cell; and
   controlling activation of the measurement object based on the data load information of the macro cell, when the UE gets within a predetermined distance to a small cell,
   wherein when the data load information of the macro cell indicates that data load of the macro cell is not lower than a threshold value, the measurement object is activated and measurement of the first frequency is started, and
   wherein when the data load information of the macro cell indicates that data load of the macro cell is lower than the threshold value, the measurement object is deactivated and the measurement of the first frequency is stopped.

2. The method according to the claim 1, wherein an initial state of the measurement object is a deactivated state.

3. The method according to the claim 1, further comprising:
   receiving mobility information of the UE,
   wherein the activation of the measurement object is controlled further based on the mobility information of the UE,
   wherein the measurement object is activated when the mobility information of the UE is lower than a threshold value, and
   the measurement object is deactivated when the mobility information of the UE is higher than the threshold value.

4. The method according to the claim 1, the method further comprising:
   receiving an initial state indicator indicating whether an initial state of the measurement object is activated or not.

5. A user equipment (UE) in a wireless communication system, the UE comprising:
   an RF (Radio Frequency) module; and
   a processor that:
   controls the RF module to receive measurement configuration information indicating a measurement object for which a first frequency is to be measured,
   receives data load information of a macro cell,
   controls activation of the measurement object based on the data load information of the macro cell, when the UE gets within a predetermined distance to a small cell,
   wherein when the data load information of the macro cell indicates that data load of the macro cell is not lower than a threshold value, the measurement object is activated and measurement of the first frequency is started, and
   wherein when the data load information of the macro cell indicates that data load of the macro cell is lower than the threshold value, the measurement object is deactivated and the measurement of the first frequency is stopped.

6. The UE according to claim 5, wherein the processor controls the RF module to receive mobility information of the UE,
   wherein the activation of the measurement object is controlled further based on the mobility information of the UE,
   wherein the measurement object is activated when the mobility information of the UE is lower than a threshold value, and
   the measurement object is deactivated when the mobility information of the UE the is higher than the threshold value.

7. The UE according to claim 5, wherein the processor controls the RF module to receive an initial state indicator indicating whether an initial state of the measurement object is activated or not.

8. The UE according to claim 5, wherein an initial state of the measurement object is a deactivated state.

* * * * *